UNITED STATES PATENT OFFICE.

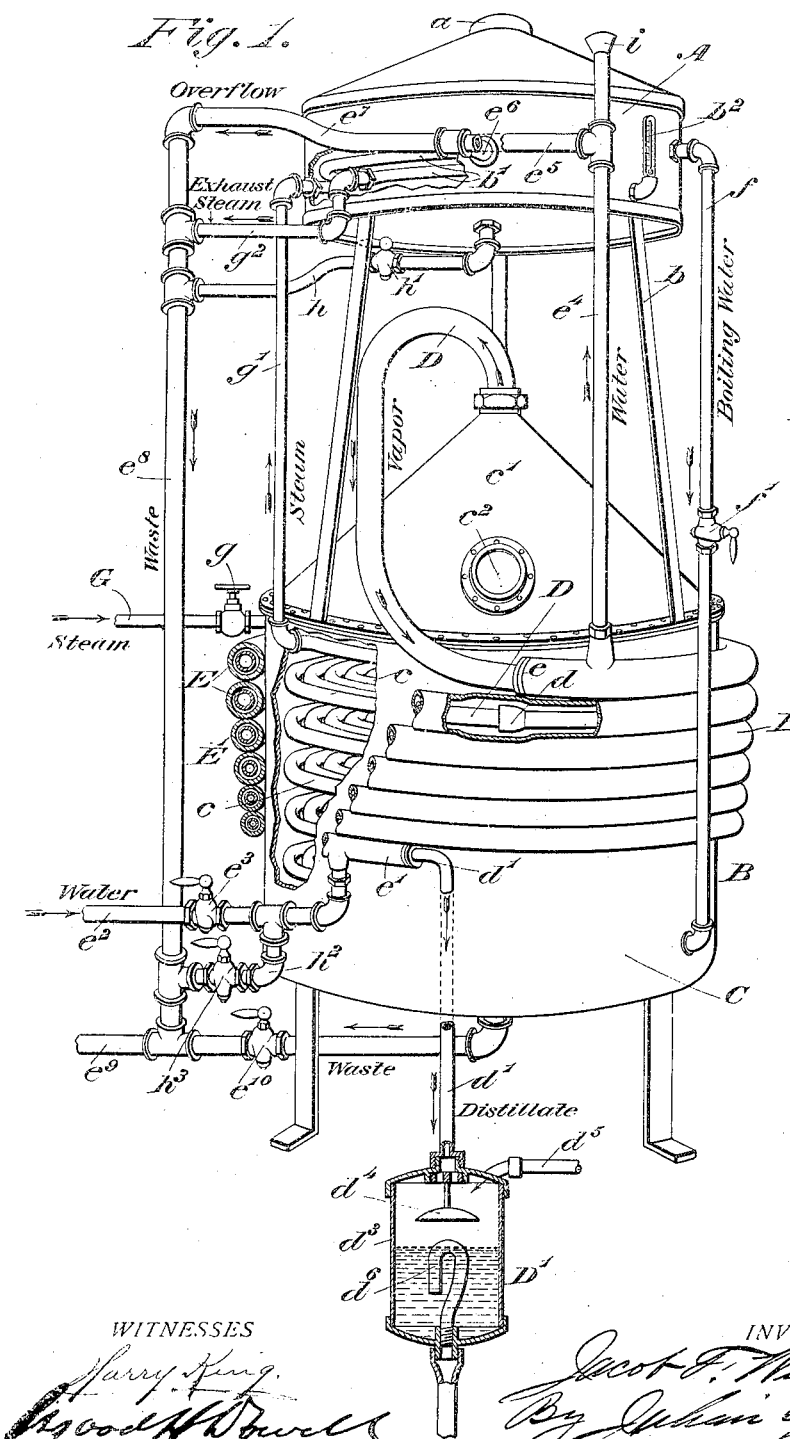

JACOB F. WITTEMANN, OF BROOKLYN, NEW YORK, ASSIGNOR TO WITTEMANN BROTHERS, OF NEW YORK, N. Y., A FIRM.

METHOD OF DISTILLING.

No. 845,286.     Specification of Letters Patent.     Patented Feb. 26, 1907.

Original application filed February 14, 1895, Serial No. 538,381. Divided and this application filed September 8, 1900.
Serial No. 29,398.

To all whom it may concern:

Be it known that I, JACOB F. WITTEMANN, a citizen of the United States, residing at borough of Brooklyn, in the city, county, and State of New York, have invented certain new and useful Improvements in Methods of Distilling; and I do hereby declare the following to be a full, clear, and exact description of the invention, such as will enable others skilled in the art to which it appertains to make and use the same.

This invention relates to methods of distilling water, and more particularly to purifying and distilling water for use in producing high-grade mineral waters, ginger-ales, and other beverages, as well as to producing palatable distilled water freed from all impurities.

The primary object of the invention is to provide an improved method whereby the water may be first purified, then evaporated, then recondensed, then recooled, and sterilized in one continuous operation for the purposes stated, also incidentally furnishing at the same time boiling water, which may be used for feeding a steam-boiler and for other purposes, thereby materially reducing the cost of production.

Other objects are to free the water from all organic and mineral matter or gases which are contained in more or less undesirable proportions in all spring, well, or river waters, and also to prevent the absorption of metallic matters from the necessary condensing-surfaces, so as to produce perfectly pure water, free from all organic matter and from the gases arising therefrom, which are undesirable, often dangerous, and liable to produce precipitation in the water or beverages prepared from the same.

Further objects of the invention are to produce pure water ready for immediate use—namely, substantially as cool as the original water—without additional cost for cooling mediums; to prevent the distilled water from reabsorbing the surrounding air, which is proved to be the vehicle of most disease germs, and particularly the air of workshops; to obtain an absolutely soft water, a condition as valuable as absolute purity, and to provide means by which the heat contained in the vaporized water may be reabsorbed and used over again, so as to economize in the fuel needed for distilling and other purposes.

With these and other objects in view the invention consists in the improved method of distilling, substantially as hereinafter described, and particularly pointed out in the claims at the end of the description.

In the accompanying drawings, which form a part of this specification, I have illustrated a preferred form of apparatus for carrying my invention into effect; but it is obvious that other forms or a differently-constructed apparatus may be employed if so desired.

Figure 1 of the drawings is a general perspective view of the apparatus with parts broken away, and Fig. 2 is a detail plan view of the connection between the feed-water pipe and the boiling-pan.

In the form shown, A designates a boiling-pan having an opening $a$ at the top thereof for the escape of gases and of sufficient size to allow a partial evaporation of the heated water contained therein, so as to throw off all organic and other gases contained in said water or created by the destruction of solid organic or mineral matter contained in the same, said opening in the pan also permitting the water to be aerated during the boiling process by the ebullition or bubbling up and separation of the particles of the water so as to come in contact with the air in order to prevent the remaining purified water from being flat when vaporized and then condensed. This pan may be supported above the still B by legs $b$ or otherwise and is provided interiorly with one or more steam-coils $b'$ for heating the water therein and has a thermometer $b^2$ communicating with said water, so that its temperature may be readily ascertained.

The still B may be supported in any approved manner and may comprise a vaporizing-retort C, having a series of steam-coils, or preferably flat layers of coils of steam-pipe $c$, located within the same and arranged above and connected to each other for the purpose of vaporizing the water which surrounds said coils, the said retort having preferably a dome $c'$ of conical formation, which may be provided with a bull's-eye or other suitable opening $c^2$ for ascertaining the height of the water in the retort, and with a condensing-pipe D, secured to the dome $c'$ and extending downwardly and coiling around said retort in the form of a spiral. This condensing-pipe may taper, as indicated, and be composed of convenient lengths of pipe of gradually-reduced sizes properly fitted or butted into each other, as at $d$. A water coil or pipe E surrounds said condensing-pipe D for condensing the vapor and cooling the resulting water contained in said condensing-pipe, the said coil E being preferably provided with stuffing-boxes $e$ $e'$ at its ends for securing tight and expansion joints where it connects with the coil D, though any other suitable connections may be employed, if preferred, the whole thus forming a condenser.

The condensing coil or pipe D may be properly centered within the coil E, and it is preferably made of pure tin to prevent the reabsorption of metallic matter from the condensing-surface, other than metallic surfaces being more or less impracticable. This coil or pipe D may have its lower end $d'$ connected to a suitable saturating-receiver D', into which sterilized air or any other suitable gas may be introduced to be absorbed by the distilled water, thereby preventing said water from absorbing impure surrounding air, though, if preferred, the distilling apparatus may be placed in a room supplied with sterilized air or any other suitable gas instead of employing a separate saturating-receiver. The receiver D' preferably comprises a closed casing $d^3$, having a distributer $d^4$ for dividing the condensed water as it enters said receiver, so as to cause it to more thoroughly mix with the air or gas which may be introduced into said receiver through the pipe $d^5$, the latter being connected to any suitable source of supply. Within the casing may be arranged a bent pipe $d^6$ of sufficient length to retain the water at a fixed height, but which will permit the liquid to flow therefrom when the liquid rises above the bend in said pipe. Instead of this pipe, however, any other suitable means may be employed for conveying the water from the receiver. Any number of saturating-receivers may be employed to cause the liquid to pass successively through each of the same.

The water-pipe $e^2$ is provided with a suitable valve or cock $e^3$ and has one of its ends connected to the source of supply, while the other end is connected to the coil E, through which the water may pass. Extending upwardly from the coil E is a pipe $e^4$, having a connection $e^5$, communicating with a pipe $e^6$, through which the water flows into the boiling-pan after it has been heated by passing through said coil E. Communicating with the pipe $e^5$ is an overflow-pipe $e^7$, bent up or having an outlet somewhat higher than the connection $e^6$ with the boiling-pan, so that the water in the boiling-pan is maintained at a constant level, while any surplus water may be conveyed by the pipe $e^7$ to the pipe $e^8$ and out of the waste-pipe $e^9$, which pipe may have one of its ends connected to the retort C and be provided with a cock $e^{10}$ to permit said retort to be cleansed and emptied. This construction maintains the water in the boiling-pan at a proper height at all times.

At $f$ is a pipe provided with a cock $f'$ and communicating at one end with the boiling-pan A and at its lower end with the retort C for supplying water thereto, the said supply of water to the retort controlling the supply of water to the boiling-pan by preventing more water from entering said boiling-pan than can be vaporized in the retort C. In practice the best results may be obtained by regulating the feed to the retort by the valve $f'$, so that the water will just about cover the steam-coils $c$, which may be observed through the bull's-eye $c^2$. Thus, although the flow through the pipe $e^5$ may not vary in volume, the valve $f'$ may be adjusted to vary the flow through the pipe $f$ to the still without causing any difference in the water-level in the boiling-pan, which is maintained by reason of the arrangement of the rising overflow-pipe $e^7$, and the supply to the boiling-pan conforms with the flow to the still, while the overflow varies with the adjustment of the valve $f'$.

G is a steam-pipe connected with a source of supply and provided with a suitable valve $g$ for regulating said supply and is connected to one end of the steam-coils $c$, located in the retort C, the other end of the steam-coils being connected to one end of the pipe $g'$. The upper end of this pipe $g'$ is connected with one end of the steam coil or coils $b'$ in the boiling-pan A, the other end of said steam coil or coils $b'$ being connected to pipe $e^8$ by the pipe $g^2$, which communicates with the waste-pipe $e^9$. This construction causes the steam to pass through the coils $c$ to vaporize the water in the retort and then passes upward to boil and purify the water in the boiling-pan A, thus utilizing the heat to the best advantage. At $h$ is a pipe provided with a valve or cock $h'$ for cleaning the boiling-pan, and at $h^2$ is a connection provided with a valve $h^3$ for cleaning the water-coil E.

The operation of the apparatus thus constructed is as follows: The cocks $e^{10}$, $h^3$, and $h'$ being closed, the cold water is turned on by opening the cock $e^3$, allowing thereby the circulation of the water through the coil E, pipes $e^4$ $e^5$ $e^6$ to the boiling-pan A, the pipe $e^7$ serving to convey any surplus water through the pipe $e^8$ to the waste-pipe $e^9$. The valve $g$ is now opened and steam is permitted to pass through the coils $c$ of the retort and coils $b'$ of the boiling-pan until the thermometer $b^2$ shows a proper temperature, whereupon the cock $f'$ in pipe $f$ is opened to allow the feed of water to the still. Preferably said cock is opened when the thermometer registers about 180° Fahrenheit, more or less, or somewhat below the boiling-point, which is to prevent possible vaporization of the water in the retort, so as to fall below the level of the uppermost steam-coil. As the temperature in the boiling-pan rapidly rises, the water therein undergoes ebullition and partial evaporation, thus throwing off all organic matter contained in the water or gases arising therefrom, while also more or less aerating by reason of the bubbling and separation of particles of the water in contact with the air, and thus purified boiling water is supplied to the retort C. Now the vaporized water will rise in the dome $c'$ and pass into the pipe D, where it is condensed by the cooling-water in the coil E to approximately the same temperature as said cooling-water, the said condensed water flowing out of the pipe D at $d'$ to and through the saturating-receiver D', from which it may be conveyed in any convenient manner. The cooling-water in the coil E in the meantime absorbs the heat of the evaporated water, becoming itself heated before reaching the boiling-pan, thereby materially reducing the fuel expenditure. As before stated, the best results may be obtained by regulating the feed to the retort C by the cock $f$, so that the water will just about cover the steam-coils, which may be seen through the bull's-eye $c^2$. To shut down, the steam should first be turned off, then the cold water, and after the thermometer $b^2$ falls below about one hundred and eighty (180) degrees Fahrenheit then the cock $f'$ may be closed; since otherwise the water in the retort C might vaporize sufficiently to fall below the level of the upper coil.

In distilling all water will deposit more or less scale, according to its condition, so frequent purification and cleansing of the still is most advisable—in fact, necessary—for its proper continuous operation and should be done as often as the precipitation of the solid matter may require. This may be accomplished in any preferred manner—such, for instance, as putting a suitable solvent in the boiling-pan and pipes, preferably through a connection $i$ of pipe $e^4$, after shutting off the cocks $e^3$ and $f'$, at the same time keeping steam supplied to the coils. The cock $h^3$ is then opened to let some of the solution run the reverse way through the coil E for about one-quarter of a minute, after which the cock $h^3$ should be closed and the cock $f'$ opened to let as much of the solution run into the retort as the feed-pipe $f$ will empty therein, boiling it thoroughly and allowing it to stand over night, when it may be drawn off. During this cleansing process and when the cooling-water is shut off steam will exhaust at the lower end $d'$ of the condensing-coil $d$, thereby sterilizing said pipe.

It is obvious that the number of coils for heating and vaporizing the water, or the number of coils for condensing the vaporized water, or the number of boiling-pans or retorts, or their general arrangement or construction may be varied and that other means than steam for heating and vaporizing the water may be employed; also, that the saturating-receiver or any other means of supplying gas or sterilized air to the distilled water may be dispensed with without departing from the spirit of my invention.

I make no claim herein to the apparatus hereinbefore described, as the same is the subject of a separate application, filed February 14, 1895, Serial No. 538,381, for apparatus for distilling, of which this application is filed as a division.

Having thus fully described my invention, what I claim as new, and desire to secure by Letters Patent of the United States, is—

1. The method of distilling and purifying water, which consists in boiling the water in a vessel having an exit into the open air whereby the water may be aerated during the ebullition and the separation of the particles, and the organic and other gases contained in the water or created by the destruction of solid matter contained therein are driven off with the vapor; vaporizing the purified water in a vaporizer or retort, and then condensing the vaporized water, all in one continuous operation, substantially as described.

2. The method of distilling water, substantially as hereinbefore described, which consists in causing the water to flow in a moving column; gradually raising the temperature of said column as it moves forward; causing the heated water to flow into a vessel adapted to permit the organic and other gases to escape into the open air; boiling the water in said vessel, so as to drive off the organic and other gases resulting from such boiling; conducting the remaining water thus purified into a retort or vaporizing apparatus; then vaporizing the same, and then condensing the vaporized water and gradually cooling the outwardly-moving column by successive association with decreasing temperatures of a cooling agent; the operation being continuous and the flow uninterrupted from the initial to the final step in the process, substantially as described.

3. The method of distilling water, which consists in creating a moving column of water; boiling the water in a suitable vessel, so as to drive off into the open air the organic and other gases contained in the water, or created by the destruction of solid matter contained therein; conducting the remaining purified water to a second vessel and there vaporizing the same, conducting the vapor to a suitable condenser, and finally condensing the vaporized water by causing the water to be distilled to pass through the condenser in such manner as to absorb the heat contained in said distillate, substantially as described.

4. The improved method of distilling, which consists in feeding the liquid to be distilled into a receptacle from which vapors can escape to the atmosphere; maintaining a level in such receptacle by means of an overflow; boiling the liquid in the receptacle; conducting the boiled liquid to a still and there vaporizing it, and subsequently condensing the vapors to obtain the distillate, substantially as described.

5. The method of distilling and purifying water which consists in boiling the water in a vessel having an exit into the open air whereby gases may be driven off, vaporizing the purified water in a retort and then condensing the vaporized water, all in one continuous operation.

In testimony whereof I affix my signature in presence of two witnesses.

JACOB F. WITTEMANN.

Witnesses:
 HENRY J. FULDA,
 JAMES GRAHAM.